July 11, 1933.  H. B. DONLEY  1,918,087
REFLECTING DEVICE
Filed May 13, 1932   2 Sheets-Sheet 1

Inventor
H. B. Donley
By W. S. M'Dowell
Attorney

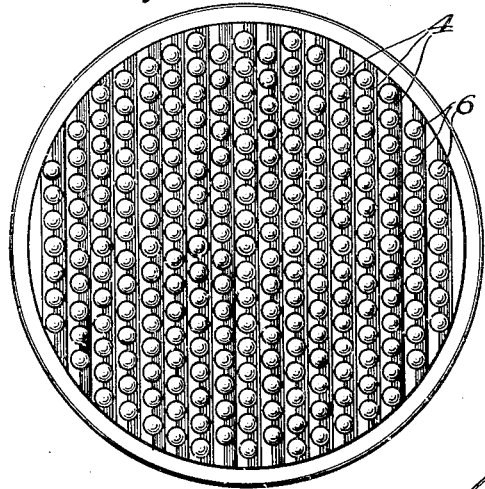
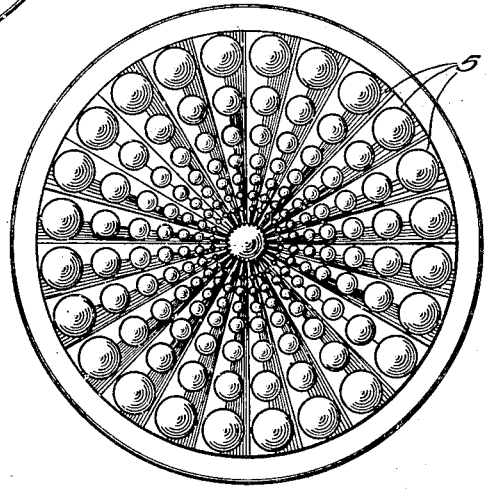
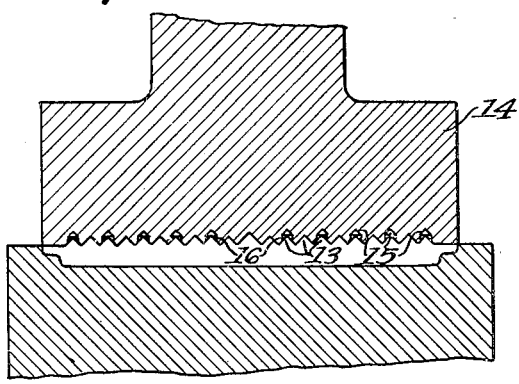
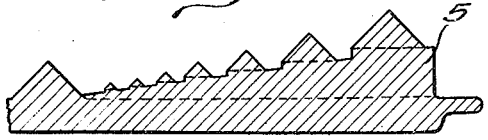

Patented July 11, 1933

1,918,087

UNITED STATES PATENT OFFICE

HAROLD B. DONLEY, OF COLUMBUS, OHIO, ASSIGNOR TO COLUMBUS AUTO BRASS COMPANY, OF COLUMBUS, OHIO, A CORPORATION OF OHIO

REFLECTING DEVICE

Application filed May 13, 1932. Serial No. 611,142.

This invention relates broadly to signalling devices and more particularly to light reflecting lenses of the type designed for reflecting and transmitting light.

Reflecting lenses of this character are now more or less in general use and employed either as highway danger signals or as tail reflectors on motor vehicles. Shown in the patent, No. 1,675,431, is a lens of this type which is formed, upon one of its surfaces, with a plurality of conical projections for reflecting light therefrom in the direction of incidence. Due to the circularly shaped base portions of these cones or projections, even though arranged closely together, flat spaces are formed between the cones which together takes up a considerable area of the lens and minimizes the reflecting properties thereof.

An object of the present invention is to make use of these conical projections but to eliminate the flat spaces therebetween by providing prisms which will occupy the whole reflecting area of the lens to thereby increase the reflecting properties thereof.

Another object of the invention is to form a die for the lens which is so shaped as to be readily and accurately made by ordinary machine operations and to eliminate hand work thereon which is tedious, laborious and tends to add to the cost of the die.

For a further understanding of the invention, reference is to be had to the following description taken in connection with the accompanying drawings in which:

Fig. 5 is a face view of a slightly modified form of the invention;

Fig. 6 is a similar view of a still further modified form of lens construction;

Fig. 7 is a sectional view taken through the lens illustrated in Fig. 6;

Fig. 8 is a vertical sectional view taken through a die construction for forming a lens in accordance with the preferred form of the invention.

Figure 1:
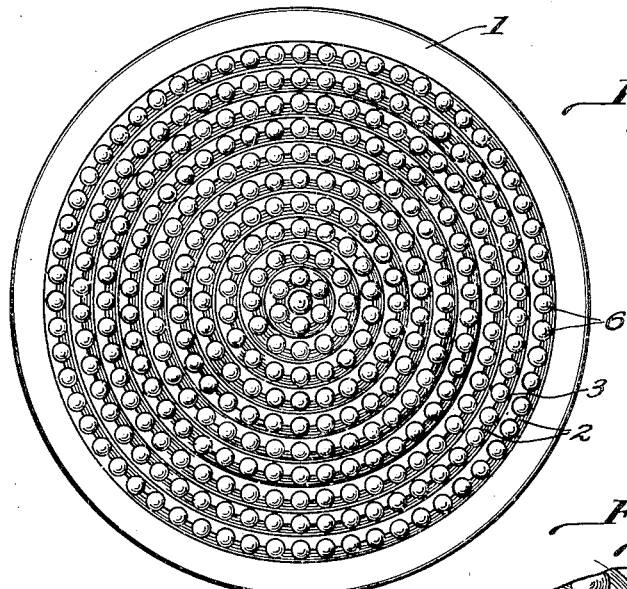
Fig. 1 is a face view of the lens embodying the present invention.
Figure 2:
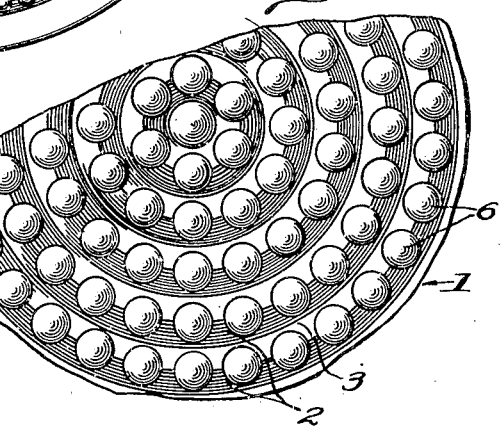
Fig. 2 is an enlarged fragmentary view thereof.
Figure 3:
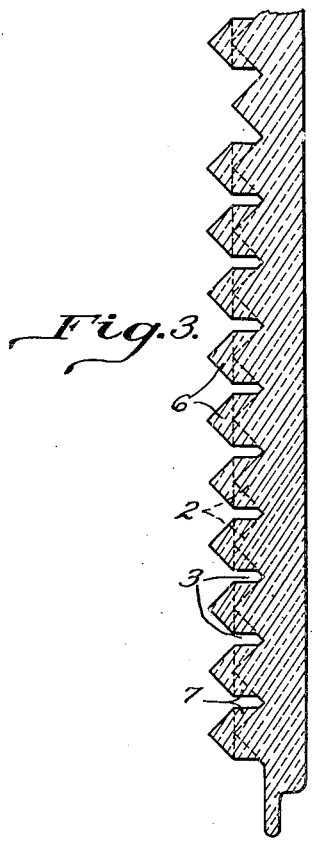
Fig. 3 is a vertical sectional view.
Figure 4:
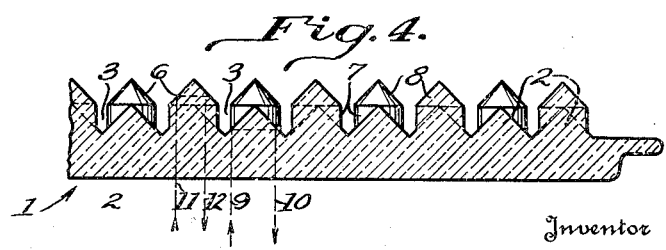
Fig. 4 is a horizontal sectional view.

Referring more particularly to the drawings, the numeral 1 designates a glass body having the shape of a circular lens of the type found in connection with tail and stop lights of motor vehicles. This lens body includes a pair of parallelly arranged surfaces, one of which is provided with a plurality of prisms 2 which are triangularly shaped in cross section and which lie adjacent one another so that their side walls or surfaces form substantially V-shaped grooves 3 therebetween. In the preferred form of the invention disclosed in Figs. 1 to 4 inclusive, these prisms are arranged concentrically with one another with their centers situated in the center of the glass body or lens, whereas, in the lens disclosed in Fig. 5, the prisms are arranged parallel to one another as at 4 across the face of the lens and in Fig. 6, the prisms 5 are radiating from the center of the lens to a point near the outer periphery thereof. In each of these forms, the prisms are so arranged relative to one another that the same will occupy the entire surface of one side of the lens leaving no flat spaces therebetween which would, if present, act to minimize the reflecting surface area of the lens.

Arranged upon the prisms 2 and spaced longitudinally thereof are projections 6 which are conical in formation and of a size slightly less in diameter at the base portions thereof than the width of the prisms so as to be within the confines of the latter and slightly spaced from the projections of adjacent prisms. The projections 6 are formed to include cylindrical base portions 7 having a height even with that of the prisms 2 and the outer conical portions 8 thereof are preferably made in the form of right angled cones which have their base lines joining the base portion 7 at the apex of the prism. It will be noted that by the provision of the base portions 7 of the projections, the cones or conical ends 8 will be so elevated as to clear the prism and not to have any portion thereof broken or interrupted thereby.

As these cones as well as the prisms are rightangled in formation, they will have the property of reflecting light passing through the lens in such a manner that the light will be redirected back or returned substantially in the direction the light is passed to the lens. This is true of both the prisms as well as the cones and as the prism formation occupies the whole area of the lens, it will be seen that all the light passing therethrough will be reflected back to the point of incidence. This passage of light has been illustrated in Fig. 4 wherein the lines 9 and 10 indicate the rays of light reflected back by the prisms 2 and the lines 11 and 12 the rays passing through the cones and back to the source of light. This complete reflection of the rays from the whole area of the lens makes the latter particularly suitable for a danger signal at the rear of the motor vehicle such as in connection with a tail or stop light or as a separate lens mountd at the rear of the vehicle. The lens when used in this capacity is usually formed of colored glass and preferably red so that when light rays, as for an example, from headlights of a car at the rear pass through the lens, the light rays will be reflected back red in color and cause the lens to be readily visible as a danger signal. As the lens is formed with a relatively large number of small conical projections and prisms, the light reflected will be more intense than if larger and fewer cones and projections were used.

In the modified form of the invention disclosed in Figs. 5 and 6, the principle or having both prisms and conical projections is also employed and in these as well as in the preferred form, the prisms have their faces placed at right angles to one another and so arranged as to occupy the whole surface area of one side of the lens. The prisms 5 of the lens disclosed in Fig. 6 which are radiating from the center of the lens are necessarily tapered and formed larger towards the outer ends thereof in order to maintain the rightangular arrangement of the prism surfaces. To follow the proportions of the radial prisms, the cones are also made to vary in size with the prisms forming the smallest cones near the center of the lens. This form of lens has an advantage due to the provision of these small cones, in that the reflected light will be more intensified near the center portion of the lens making a spot which has the appearance of being highly illuminated and therefore visible from a great distance.

The molds or dies used for forming these lenses and particularly the one of the preferred form has been illustrated in Fig. 8. The formation of these dies is extremely simple for the reason that the grooves and depressions in the die which forms the prisms and cones upon the lens may be very readily made by the operation of a milling cutter or by forming the same on a lathe.

Preferably, the grooves 13 for the prisms are first cut in the die member 14 and after this operation, the depressions or holes 15 are made by a tool (not shown) shaped in such manner as to form the wall surfaces at the inner ends of the holes right angled and in the shape of inverted cones. These holes which are slightly spaced from one another are drilled in the bottom of the grooves and to such depth that the base lines of the cone portions are substantially even with the bottom of the grooves and with the cylindrical portion 16 of the holes connecting the cones with the side surfaces of the grooves. It will be seen that by this method of forming the die, the same may be made very accurately by a machine operation, eliminating the usual hand work thereon which is tedious and laborious and thereby producing a die at comparatively small cost as no particular skill is required in forming the same.

What is claimed is:

1. A reflecting device of the character set forth, comprising a body having a plurality of prisms formed upon one of its surfaces which are of a triangular cross sectional formation, and conical projections formed with said prisms and arranged on each of said prisms with their longitudinal axes coinciding substantially with the axes of said prisms.

2. A reflecting device of the character set forth, comprising a transparent body having a plurality of triangularly shaped prisms arranged with their longitudinal axes parallel to the surface of said body, and a plurality of conical projections formed with said body and arranged upon said prisms.

3. A reflecting device of the character set forth, comprising a transparent body having one surface thereof grooved to provide a plurality of triangularly shaped prisms, and a plurality of conical projections formed with said body and arising from said prisms, said projections having the centers of their base portions arranged upon the apex lines of said prisms.

4. A reflecting device of the character described, comprising a disk like glass body, a plurality of right angled prisms formed with said body and occupying the full reflecting area thereof, and right angled cones projecting from the apexes of said prisms.

5. A reflecting device of the character described, comprising a disk like glass body, one of the surfaces of said body being formed with prisms arranged parallel with said surface and triangular in cross sectional formation, said prisms joining one another at the base portions thereof and thereby occupying the whole reflecting area of said surface, and closely spaced right angled cones projecting from the prismed surface of said body and serving together with said prisms to reflect light passing through said body.

6. A reflecting device of the character set forth, comprising a glass body shaped in the form of a lens, prisms formed with one face of said lens having their longitudinal surfaces arranged at right angles to one another producing similarly shaped grooves therebetween, and right angled cones slightly spaced from one another throughout the length of said prisms and projecting from the latter with their longitudinal axes disposed perpendicularly to the apex lines of said prisms.

7. A reflecting device of the character set forth, comprising a glass body shaped in the form of a lens, concentrically arranged right angled prisms formed with one surface of said lens and having their centers disposed in the center of the lens, and right angled cones slightly spaced from one another and projecting from said prisms.

8. A reflecting device of the kind described, comprising a disk like body formed of glass, right angularly shaped prisms formed upon one surface of said body and having their longitudinal axes parallel with said surface, and closely arranged projections formed upon said prisms having their outer ends shaped in the form of right angled cones of which the base lines are disposed substantially at the apex lines of said prisms.

In testimony whereof I affix my signature.

HAROLD B. DONLEY.